3,661,842
POLYESTERS STABILIZED WITH AMMONIUM HEXAFLUOROPHOSPHATE FLUORIDE, TRIPROPYLAMMONIUM DIHYDROGEN PHOSPHATE, AND TETRAMETHYLAMMONIUM HEXAFLUOROPHOSPHATE
John A. Price, Swarthmore, and Mary J. Stewart, Media, Pa., assignors to FMC Corporation, Philadelphia, Pa.
No Drawing. Filed Dec. 2, 1969, Ser. No. 881,600
Int. Cl. C08g 51/60
U.S. Cl. 260—45.9                        5 Claims

ABSTRACT OF THE DISCLOSURE

A stabilized polyester resin composition comprising the product formed by incorporating a minor amount of a compound selected from the group consisting of tetramethylammonium hexafluorophosphate, tripropylammonium dihydrogen phosphate, and ammonium hexafluorophosphate fluoride into a melted saturated polyester resin.

---

This invention relates to highly polymeric linear polyester resins that possess improved thermal stability and to a method of producing same.

Saturated linear polyester resins can be prepared by first carrying out a condensation reaction between a suitable dicarboxylic acid or ester thereof having no olefinic unsaturation with a saturated diol to form a prepolymer. The resulting prepolymer is then polycondensed to form the desired polyester resin. When an ester of a dicarboxylic acid is used as the starting material, it is first reacted with a diol in the presence of a transesterification catalyst by means of an ester-interchange reaction; whereas when a dicarboxylic acid is used as the starting material, it is first subjected to a direct esterification reaction with the diol in the presence of what is generally called a first stage additive or ether inhibitor. In either instance, the resulting reaction product, which may be generally described as a polyester prepolymer, is then polycondensed in the presence of a polycondensation catalyst to form the polyester resin.

For example, in the case of the transesterification method of preparing polyethylene terephthalate, ethylene glycol is reacted with dimethyl terephthalate to form the polyester prepolymer which is comprised mainly of bis-2-hydroxyethyl terephthalate; or in the direct esterification method, ethylene glycol is reacted with terephthalic acid to form the resulting polyester prepolymer which is then polycondensed to form the desired polyester resin.

Saturated linear polyester resins, such as polyethylene terephthalate and many others, are widely used in the production of films and fibers and the like. However, it is generally known that such polyester products degrade when exposed to heat for a substantial period of time. Such degradation is particularly a problem in the extrusion and spinning processes of the finished resins. Additionally, the fibers produced from such resins are extensively used in the textile field and, as a result of this application, are subjected to rather extreme temperatures in the process of washing, drying, and ironing. Therefore, it is highly desirable that the polyester resin composition possess as much stability at high temperatures as possible.

Therefore, it is an object of the present invention to prepare a highly polymeric saturated linear polyester resin composition which exhibits improved thermal stability.

Another object of the present invention is to provide a method of preparing saturated linear polyester resins exhibiting such a high degree of thermal stability.

These and other objects are accomplished in accordance with the present invention with a stabilized polyester resin composition formed by incorporating a minor amount of a compound selected from the group consisting of tetramethylammonium hexafluorophosphate, tripropylammonium dihydrogen phosphate, and ammonium hexafluorophosphate fluoride into a melted saturated polyester resin.

While filament-forming polyalkylene terephthalate and terephthalate copolyester resins are the preferred resins for this invention, based on commercial importance, other homo- and copolyester resins are also included. Examples of other resins useful for this invention include those which can be derived from dicarboxylic acids and diols such as alkylene glycols having from 2 to 10 carbon atoms and the gem-dialkyl glycols such as neopentyl glycol. In general, the dicarboxylic acids include aliphatic dicarboxylic acids such as adipic acid and higher homologues and aromatic dicarboxylic acids, including for example, isophthalic acid, terephthalic acid, bibenzoic acid, and the naphthalic acids. Mixtures of such dicarboxylic acids and diols can be used to prepare copolyesters coming within the present invention. The polyester resins of the present invention are known as saturated polyesters; meaning that they do not contain any olefinic unsaturation.

The preparation of the homo- and copolyester resins of the present invention via the ester-interchange reaction is generally carried out with a molar ratio of diol, such as ethylene glycol, to an ester of a dicarboxylic acid, such as dimethyl terephthalate, of from about 1:1 to about 15:1, respectively, but preferably from about 1.2:1 to about 2.6:1. The transesterification or ester-interchange reaction is generally carried out at atmospheric pressure in an inert atmosphere such as nitrogen initially at a temperature ranging from about 125° C. to 250° C., but preferably between about 150° C. and 200° C. in the presence of a suitable transesterification catalyst. For example, the transesterification catalyst used may be lithium hydride or zinc acetate at a concentration ranging from about 0.01% to about 0.20%, based on the weight of the ester of the dicarboxylic acid used in the initial reaction mixture. During the first stage of this reaction, methyl alcohol is evolved and is continuously removed by distillation. After a reaction period of about 1 to 2 hours, the temperature of the reaction mixture is raised to from about 200° C. to about 300° C. for approximately 1 to 3 hours in order to complete the reaction, form the desired polyester prepolymer, and distill any excess glycol.

In the case of the direct esterification metod of preparing saturated linear polyester resins, the reaction is generally carried out with a molar ratio of diol, for example, ethylene glycol, with a dicarboxylic acid, such as terephthalic acid, of from about 1:1 to about 15:1, but preferably from about 1.2:1 to about 2.6:1. The direct esterification step is generally carried out at temperatures ranging from about 180° C. to 280° C. in the absence of an oxygen containing atmosphere at atmospheric or elevated pressure for about 2 to 4 hours to form the desired polyester prepolymer. For example, the reaction may be carried out in an atmosphere of nitrogen.

The first stage of the direct esterification method is generally carried out in the presence of a suitable additive or buffer, such as triethylamine, at a concentration ranging from about $5 \times 10^{-5}$ mole to about $5 \times 10^{-1}$ mole of additive per mole of dicarboxylic acid in the initial reaction mixture.

Conventionally, the polycondensation step in the preparation of the subject polyester resins by either the transesterification method or direct esterification method is generally accomplished by adding a suitable polycondensation catalyst to the polyester prepolymer and heating the blend thereof under reduced pressure of from about 0.5 to 20 mm. of mercury while being agitated at a temperature of from about 260° C. to 325° C. for from 2 to 4 hours. For example, the polycondensation catalysts suitable for use are antimony trioxide and antimony sec-butoxide, at concentrations ranging from about 0.01% to about 0.2%, based on the weight of the polyester prepolymer to be polycondensed.

In the practice of the present invention, the above-defined phosphate thermal stabilizers can be incorporated in the resin composition at various stages. For example, in the preparation of polyester resin, the present thermal stabilizers can be suitably mixed with the polyester resin reactants before commencing their reaction, or at any stage after the initial reaction has begun, if indicated. However, in most instances, it has been found that it is preferred to mix or blend the present thermal stabilizers into the polyester resin immediately after the polycondensation step has been completed.

It has been found that tetramethylammonium hexafluorophosphate, tripropylammonium dihydrogen phosphate, and ammonium hexafluorophosphate fluoride are effective as thermal stabilizers in polyester resin compositions when employed in minor or heat stabilizing amounts. In general, amounts ranging from about 0.01% to about 0.5%, based on the weight of the polyester resin are used. However, it has been found that a concentration ranging from about 0.02% to about 0.3% is preferred in most instances. However, when indicated, concentrations less or greater than the above can be used but the effectiveness thereof is generally reduced proportionally.

The relative effectiveness of compounds as thermal stabilizers in polyester resins can be most accurately expressed on the basis of percent broken bonds resulting from exposing a given resin composition containing such a stabilizer to elevated temperatures for a given period, rather than from a direct reading of the difference between original viscosity and the degraded intrinsic viscosity as developed in the above procedure. It is known that polyester resins having higher original intrinsic viscosities will generally show a greater drop in intrinsic viscosity when exposed to elevated temperatures than those with lower original intrinsic viscosities; although on a percent broken bond basis, the stability of such a resin composition having a higher original intrinsic viscosity might be equivalent to one exhibiting a lesser drop in intrinsic viscosity.

The following examples of several preferred embodiments will further serve to illustrate the present invention, although it will be understood that these examples are included merely for the purpose of illustration and are not intended to limit the scope of the present invention. All parts are by weight unless otherwise indicated.

EXAMPLE I

A mixture comprising 600 grams of dimethyl terephthalate, 396 mls. of ethylene glycol, and 0.24 gram of zinc hydroxide was charged into a reaction vessel equipped with a nitrogen inlet, heating means and stirring means. The reaction mixture was agitated and heated at atmospheric pressure to 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE II

Fifty grams of the prepolymer product of Example I was mixed with 0.02 gram of antimony (III) oxalate and placed in a reaction vessel. The reaction mixture was heated at about 280° C. under reduced pressure of from 0.05 to about 0.1 mm. of mercury while under agitation for about 1½ hours to bring about the polycondensation of the polyester prepolymer and formation of a polyester resin. The polyester resin formed had an original intrinsic viscosity of 0.74, a degraded intrinsic viscosity of 0.54, a diethylene glycol content of 1.07 weight percent, a carboxyl value of 39 meq./kg., and a Y color value of 62.5. The percent broken bonds of this resin product per the hereinafter described testing procedure and equation was calculated to be 0.218%.

EXAMPLE III

Fifty grams of the prepolymer product of Example I was mixed with 0.02 gram of antimony (III) oxalate and placed in a reaction vessel. The reaction mixture was heated at about 280° C. under reduced pressure of from about 0.05 to about 0.1 mm. of mercury while under agitation for about two hours to bring about the polycondensation of the polyester prepolymer and the formation of the polyester resin. At the end of the polycondensation reaction, 0.026 gram of ammonium hexafluorophosphate fluoride ($NH_4PF_6$—$NH_4F$) was thoroughly stirred into the melted polyester resin product after which the resulting product was cooled. The polyester resin composition formed had an original intrinsic viscosity of 0.73, a degraded intrinsic viscosity of 0.67, a diethylene glycol content of 0.5 weight percent, a carboxyl content of 10 meq./kg., and a Y color value of 65.3. The percent broken bonds of this polyester resin composition per the hereinafter described procedure and equation was calculated as 0.047%.

EXAMPLE IV

A mixture comprising 600 grams of dimethyl terephthalate, 361 mls. of ethylene glycol, and 0.218 gram of zinc hydroxide was charged into a reaction vessel equipped with a nitrogen inlet, heating means and stirring means. The reaction mixture was agitated and heated at atmospheric pressure to 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE V

Fifty grams of the prepolymer product of Example IV was mixed with 0.02 gram of antimony (III) oxalate and placed in a reaction vessel. The reaction mixture was heated at about 280° C. under reduced pressure of about 0.05 to about 0.1 mm. of mercury while under agitation for about two hours to bring about the polycondensation of the polyester prepolymer and formation of a polyester resin. At the end of the polycondensation reaction, 0.0285 gram of tetramethylammonium hexafluorophosphate

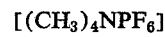

$$[(CH_3)_4NPF_6]$$

was thoroughly stirred into the melted polyester resin product after which the resulting product was cooled. The polyester resin composition formed had an original intrinsic viscosity of 0.72, a degraded intrinsic viscosity of 0.63, a diethylene glycol content of 0.47 weight percent, a carboxyl content of 8 meq./kg., and a Y color value of 67.7. The percent broken bonds of the resulting polyester resin composition per the hereinafter described testing procedure and equation was calculated as 0.081%.

EXAMPLE VI

A polyester prepolymer was prepared by the same method used in Example I with the following reactants: 600 grams of dimethyl terephthalate, 396 mls. of ethylene glycol, and 0.24 gram of lithium hydride.

EXAMPLE VII

Fifty grams of the prepolymer product of Example VI was mixed with 0.02 gram of antimony trioxide and placed in a reaction vessel. The reaction mixture was heated at about 280° C. under reduced pressure of from about 0.05 to about 0.1 mm. of mercury while under agitation for about two hours to bring about the polycondensation of the polyester prepolymer and formation of a polyester resin. At the end of the polycondensation reaction, 0.02 gram of tripropylammonium dihydrogen phosphate $$[(C_3H_7)_3NHH_2PO_4]$$

was thoroughly stirred into the melted polyester resin product after which the resulting product was cooled. The polyester resin composition formed had an original intrinsic viscosity of 0.62, a degraded intrinsic viscosity of 0.59, a carboxyl content of 15 meq./kg., and a diethylene glycol content of 0.44 weight percent. The percent broken bonds of this polyester resin composition per the hereinafter described testing procedure and equation was calculated as 0.035%.

In the above examples, the original intrinsic viscosity values of the polyester resin products were obtained by measuring the intrinsic viscosities of the resin compositions as produced.

The degraded intrinsic viscosity values were determined by the following procedure: The polyester resin composition was ground and passed through a 10 U.S.S. mesh screen and dried at 120° C. in vacuo for 16 hours, then cooled in a desiccator. Two to three grams of this dried resin was placed in a test tube which was then inserted into an aluminum block preheated to 280° C. (±0.5° C.). The block was then sealed and evacuated to 0.1 mm. of mercury. After holding for about 10 to 15 seconds, the block was filled with dried, oxygen-free nitrogen gas. This vacuum-nitrogen purge was repeated for a total of three times; the entire process took 5 to 7 minutes. Then, the resin sample was left in the heated block for an additional two hours under a slow stream of nitrogen. After this two-hour period, the resin sample was removed from the block and placed in a desiccator which was first evacuated and then filled with nitrogen. The intrinsic viscosity of this resin product was determined and such an intrinsic viscosity value is noted in the examples above as the degraded intrinsic viscosity.

The percent broken bond values given in the above example were calculated by the use of the following equation:

$$\text{Percent Broken Bonds} = \left[\left(\frac{K}{V_f}\right)^{1/a} - \left(\frac{K}{V_i}\right)^{1/a}\right] \times 9.6 \times 10^3$$

The valves of K and a may be found in the literature, such as Conix, A., Makromol., Chemie 26, p. 226 (1958), wherein K=0.00021 and a=0.82. $V_f$ in the above equation is the degraded or final intrinsic viscosity value and $V_i$ is the original or initial intrinsic viscosity value.

The percent broken bonds value for polyethylene terephthalate is defined as the bonds broken per mole of ethylene terephthalate repeating unit times 100.

All the intrinsic viscosity determinations of the polyester resin products produced in the above examples were determined in a 60% phenol-40% tetrachloroethane solution, wt./wt., at 30° C., according to conventional laboratory procedure. The carboxyl values of the resins set forth in the above examples are expressed as equivalents per million grams (eq./$10^6$ gr. or meq./kg.).

The color values of the resins produced in the above examples were measured by a "Color-Eye" 'Model D–1), which is the trade name for a differential colorimeter manufactured by the Instrument Development Laboratories, Attleboro, Mass. The color values obtained are based on luminance (Y in the C.I.E. system), which is a measurement of the proportion of the incidence light reflected relative to a white vitrolite standard and, therefore, a measure of the whiteness or lightness of the polyester polymer being evaluated. The determination of Y in the C.I.E. system, as hereinafter set forth, was determined by using a molded plaque of the polyester resin product having the dimensions 1" x 1" x 1/16". According to the C.I.E. system, polyester resins exhibiting the higher Y values are those which are whiter in color. Therefore, it is obvious that polyester resins exhibiting a higher Y value are preferred.

The results in the above examples indicate that the present additives, when added to saturated linear polyester resins, act to stabilize or reduce the degradation effects of higher temperatures upon such polyester resins. The change or difference between the original intrinsic viscosity and the degraded intrinsic viscosity is a direct measure of the heat stabilizing effect that the present thermal stabilizers have upon polyester resins and can be readily calculated from the above results. Additionally, the present polyester compositions are characterized by their exceptionally low diethylene glycol contents and carboxyl values. It is also to be particularly noted that all the present resin compositions exhibit excellent color values. Because of these excellent properties, the present polyester compositions are particularly valuable for use in the preparation of films and fibers.

We claim:

1. A stabilized, saturated polyalklene dicarboxylate polyester resin composition comprising the product formed by incorporating a minor amount of from about 0.01% to about 0.5% based on the weight of the polyester resin of an additive selected from the group consisting of ammonium hexafluorophopshate fluoride, tripropylammonium dihydrogen phosphate, and tetramethylammonium hexafluorophosphate into the melted saturated polyester resin.

2. A composition of claim 1 wherein the polyester resin is polyethylene terephthalate.

3. A composition of claim 2 wherein the additive is tetramethylammonium hexafluorophosphate.

4. A composition of claim 2 wherein the additive is ammonium hexafluorophosphate fluoride.

5. A composition of claim 2 wherein the additive is tripropylammonium dihydrogen phosphate.

No references cited.

HOSEA E. TAYLOR, Primary Examiner

W. E. PARKER, Assistant Examiner